Patented July 26, 1949

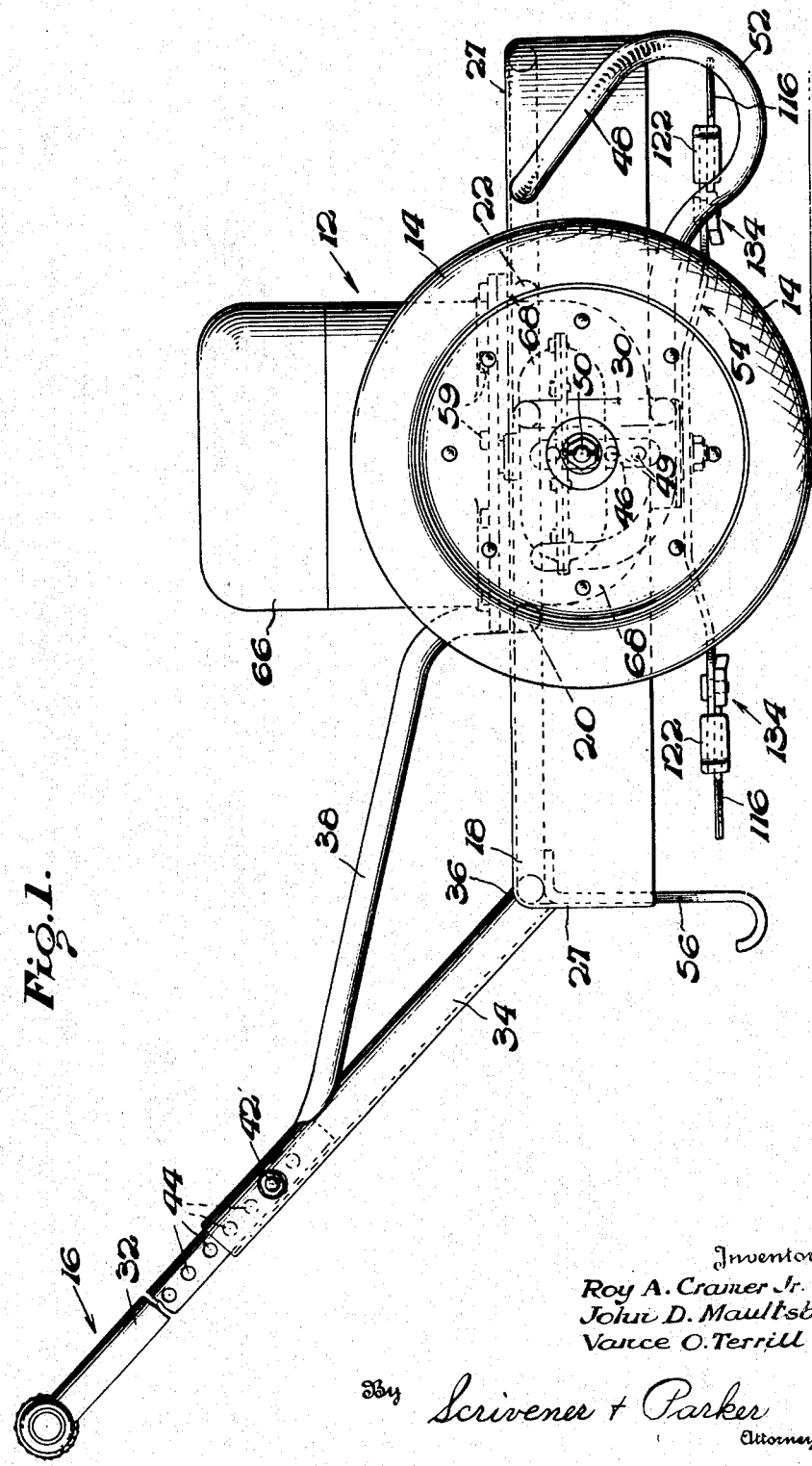

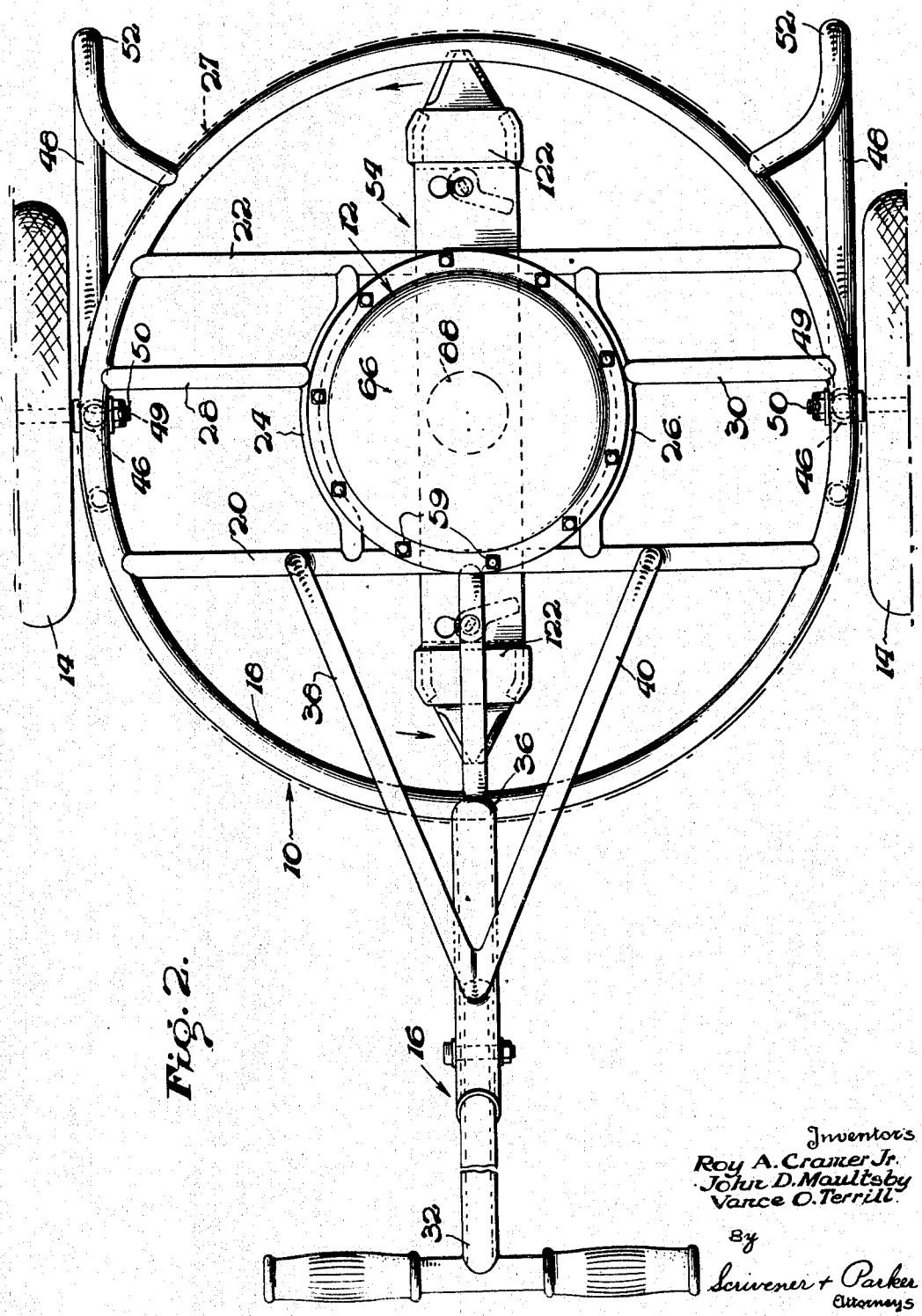

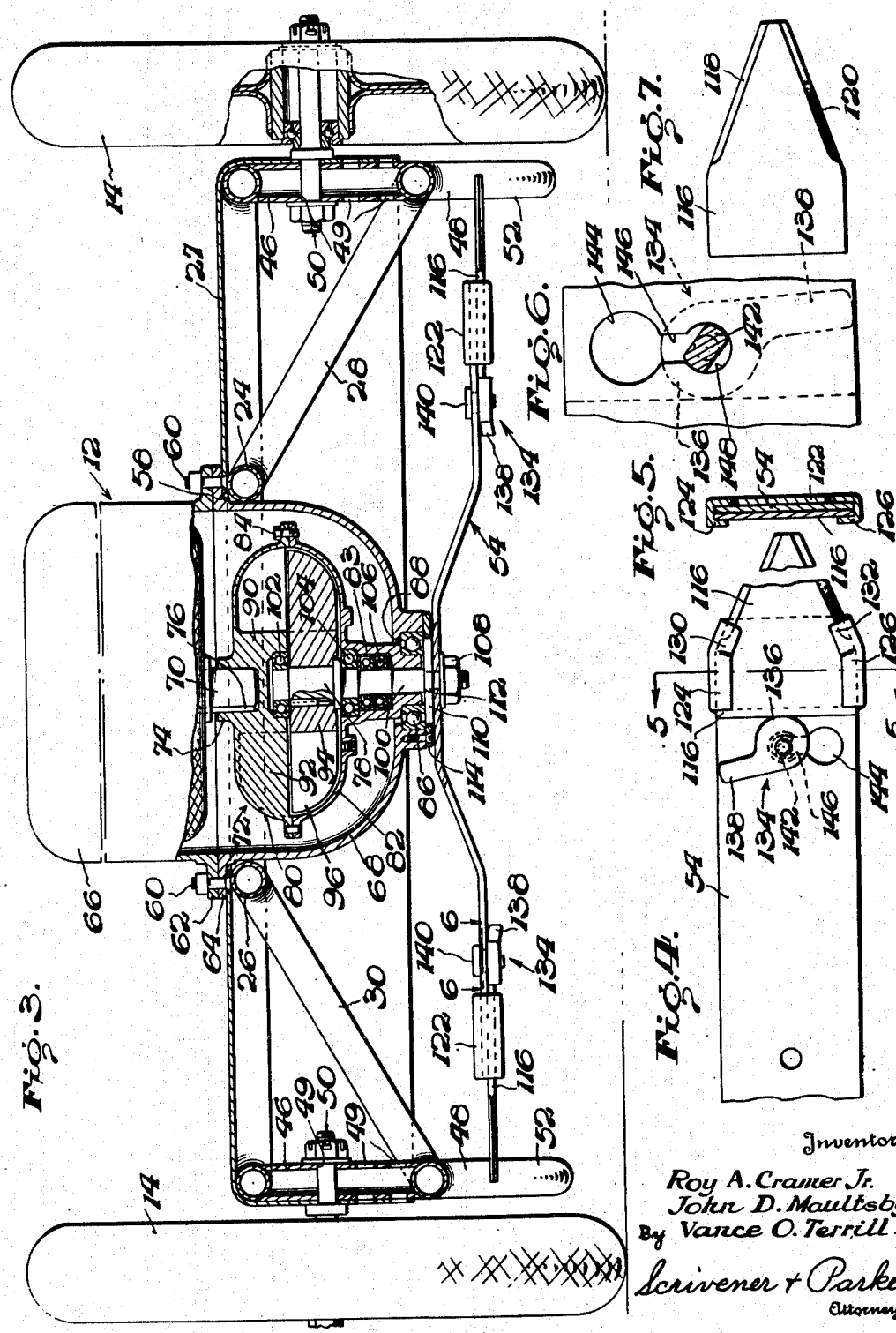

2,477,442

UNITED STATES PATENT OFFICE 2,477,442

LAWN MOWER

Roy A. Cramer, Jr., John D. Maultsby, and Vance O. Terrill, Kansas City, Mo., assignors to Cramer Posture Chair Company, Kansas City, Mo., a partnership Application February 12, 1945, Serial No. 577,370

2 Claims. (Cl. 56—25.4)

This invention relates to lawn mowers, and more particularly to mowers of the rotary type including a cutter bar which is rotated at a relatively high speed in a plane horizontal to the ground.

It has heretofore been proposed to employ power means for rotating the rotary cutter bar of lawn mowers of the rotary type, such power means being of the nature of an electric motor or an internal combustion engine. Mowers of this type are generally manually propelled over the ground, and the use of the power means relieves the operator of the work of actually cutting the grass. All that is required of the operator is the effort of merely pushing the device over the lawn, which is very slight as compared to the energy of actually cutting the grass. The advantages of mowers of this character are well recognized, the chief one being its ability to cut high grass with equal facility as the low grass.

One of the main problems and disadvantages of mowers of the above character, however, was the protection of the power driving mechanism and the cutter bar, when the latter met with an obstruction, such as a stump, bush, curbing or the like. Various types of friction clutches have been used in an attempt to prevent breakage of the parts when such a condition occurred, but such clutches have not been entirely satisfactory since they required frequent adjustment and periodic renewal of the friction surfaces. Moreover, adequate protection of the cutter bar could not be secured due to the difficulty of adjusting the friction clutch to the proper degree of loading.

It is accordingly one of the objects of the present invention to provide a rotary lawn mower of the type employing power mechanism for rotating the cutter bar and which is so constituted as to avoid the above disadvantages.

Another object is to provide a rotary mower of the above type which embodies a novel protective arrangement of the power mechanism which requires no attention on the part of the operator.

Still another object resides in the provision of a novel power transmitting apparatus or clutch interposed between the power driving mechanism and the cutter bar which comprises a fluid clutch which not only possesses the highly desirable characteristic of automatically slipping, and hence fully protecting the power mechanism from damage, when the cutter bar strikes an obstruction, but also requires no adjustment or renewal of clutch linings, thus reducing operating costs to a minimum.

A still further object includes the provision of a novel frame work or support for the power mechanism and clutch which is of rigid, light-weight construction and is so arranged that the clutch is mounted in a vertical position in order to simplify the connections to the cutter bar.

A further object is to provide a novel and simplified mounting for the power means and clutch so that these parts may be quickly assembled and disassembled from the framework, thus greatly facilitating manufacture and assembly of the apparatus and simplifying any repair operations.

A still further object resides in the provision of a novel cutter blade construction wherein the cutting blades may be quickly and easily removed from the cutter bar for sharpening or replacement.

Other objects and advantageous features of the invention will appear more fully hereinafter from a consideration of the following detailed description when taken in connection with the accompanying drawings, wherein a preferred embodiment of the invention is illustrated. It is to be expressly understood, however, that the drawings are utilized for purposes of illustration only and are not designed as a definition of the limits of the invention, reference being had for this purpose to the appended claims.

In the drawings, wherein similar reference characters refer to similar parts throughout the several views:

Fig. 1 is a side view of a rotary power-driven lawn mower embodying the principles of the present invention;

Fig. 2 is a plan view of the mower, illustrating the supporting framework and the novel cutter bar construction;

Fig. 3 is a rear view of the mower, certain parts thereof being shown in section, and illustrating the novel fluid clutch connection between the power mechanism and the cutter bar;

Fig. 4 is a bottom view of one end of the cutter bar and shows the novel cam construction for securing the cutting blade in position;

Fig. 5 is a transverse section of one end of the cutter bar taken along lines 5—5 of Fig. 4;

Fig. 6 is an enlarged view of the cam construction taken along lines 6—6 of Fig. 3, and Fig. 7 is a plan view of one of the cutter blades.

Referring more particularly to Figs. 1 and 2, a rotary lawn mower constructed in accordance with the present invention is illustrated therein as including a tubular framework 10 supporting a power assembly 12 and adapted to be manually propelled over the ground by means of rotatable wheels 14 and handle 16.

More particularly, the framework 10 comprises a base-supporting circular member 18 having a pair of cross braces 20 and 22, the latter, together with braces 24 and 26 serving to provide a rigid supporting structure over which a stamped, cylindrical base or cover 27, of relatively light-gauge metal is fitted, all of the above parts being preferably welded together to form a unitary structure. As will be observed from Fig. 2, the central portions of braces 20 and 22 together with braces 24 and 26 constitute a centrally-disposed rigid support for the power assembly 12, and this support may be additionally strengthened as by means of additional braces 28 and 30. The handle 16 comprises an upper handle portion 32 and a lower portion 34, the latter being welded at its lower end to the cover 28 and member 18 at 36, and being braced against lateral movement by the diagonally-arranged struts 38 and 40. Preferably, handle portions 32 and 34 are telescoped, one within the other, and in order to provide an arrangement for varying the height of the handle, a nut and bolt structure 42, received in aligned openings in the opposite walls of portion 34, may be passed selectively through one of a plurality of spaced-apart openings 44 in the lower end of the portion 32.

In order to support the wheels 14, a pair of vertically arranged struts 46 are provided, one disposed on each side of the framework and having opposite ends connected respectively to the member 18 and an extension member 48. As shown, Fig. 3, these struts are provided with a plurality of openings 49 for receiving the stub axles 50 of the wheels 14, this arrangement enabling the height of the mower to be readily adjusted with respect to the ground. It will be understood that this construction is highly desirable inasmuch as the depth of cut of the grass may be readily and quickly changed by merely securing the stub axles 50 in the desired opening.

The extension members 48 not only constitute a support for the lower ends of the struts 46, but also form a front wheel substitute which materially facilitates the operation of the mower. As shown, the members 48 have their opposite ends secured to the member 18 at spaced-apart points, and are provided with downwardly curved forward extensions 52 which serve as ground-engaging members in order to prevent the cutter bar 54 from cutting into the ground. It will be readily understood that if desired, these extensions 52 may be omitted, and a pair of small wheels, supported from the member 18, forwardly of the wheels 14, substituted therefor. A bracket 56 is preferably secured to the member 18 at the rear portion thereof in order to form a rest or support for the mower when not in use. In order to secure a light-weight construction which may be economically and rapidly manufactured and assembled, it is preferred that the framework, braces, struts and handle portions heretofore described, be formed of aluminum alloy tubing and that the various parts which are rigidly connected together, be welded.

In order to support the power assembly 12 substantially centrally of the base 27, the latter is provided with an opening 58, the adjacent peripheral portion of the base having a plurality of openings for receiving nut and screw assemblies 59, 60 for securing the flanges 62 and 64 of a power device 66 and a housing member 68, respectively, in position on the base. While the power device 66 may be of any suitable type, it is preferred to employ an internal combustion engine of light-weight construction, and so arranged as to have an output shaft 70 which is arranged vertically, see Fig. 3.

Novel means are employed by the present invention for drivably connecting the output shaft 70 with the cutter bar 54 and preferably such means is so constituted as to not only form a driving connection which will automatically slip or yield in the event that the cutter bar encounters a stationary object such as a stump for example, but also to be so arranged as to require no attention whatsoever on the part of the operator. As shown, such means comprises a fluid clutch or torque transmitting device 72 including an input member 74, connected to the shaft 70 as by a key 76, and an output member 78. Member 74 includes complementary upper and lower casing sections 80, 82 secured together by screws 84, the casing section 82 extending downwardly in the form of a sleeve 83 surrounding the lower end of output member 78 and being rotatably mounted, as by means of ball bearings 86, in an opening 88 in the housing 68 which opening is aligned with the shaft 70. Input member 74 is formed with a hub 90 having a plurality of impeller blades 92 radiating therefrom, the outer ends of the blades being secured to the casing section 80. The output member 78 is provided with an impeller comprising a hub 94 and a similar set of impeller blades 96 radiating therefrom, the hub being suitably secured to a shaft 100, and the outer ends of the blades being slightly spaced from the casing section 82. The shaft 100 is rotatably mounted in the hub 90 and in casing section 82 as by means of bearings 102 and 104 respectively. Since the casing sections 80, 82 are filled with a suitable fluid, a liquid-tight seal 106 is provided between shaft 100 and sleeve 83.

The lower extremity of the shaft 100 is securely attached by nut 108 to the cutter bar 54, a washer 110 being preferably interposed between the top of the cutter bar and a shoulder 112 on the shaft, the washer having its peripheral portion in contact with the lower face of the bearing 86, as shown. In order to effectively prevent grass clippings from contacting the rotatable washer 110 and possibly becoming wedged in between the washer and the housing 68, an annular washer 114 is rigidly secured to the lower extremity of the housing 68 and has its lower face positioned closely adjacent the cutter bar 54. The exterior surface of the washer 114 thus prevents grass from winding around with the rotatable washer 110 which otherwise might cause damage to the mower.

One of the features of the present invention includes the provision of a novel cutter bar including means for removably securing the cutter blades in operative position at the ends of the bar. As shown the cutter bar 54 is formed of a single strip of metal having its opposite ends equipped with removable blades 116, each blade comprising sharpened edges 118 and 120. Since the mechanism for securing the blade to the bar is the same for each end of the latter, one such mechanism only, will be described in detail. In the form illustrated, the end of the bar is provided with a strap 122 defining a pair of channel members 124 and 126 extending beneath the bar end, and defining a pocket into which the blade 116 may be fitted, as shown in Fig. 4. Preferably the members 124 and 126 are so shaped as to provide inwardly directed portions 130 and 132 which act as abutments or stops for the converging side edges of the blade, and when such edges engage these stops, any further outward movement of the blade is arrested and the same may be locked in position. It will be understood that if desired, the straps 122 may be applied to the under sides of the bar 54 in which event the members 124 and 126 will be secured to the top surface of the bar, and blades 116 may be inserted in the pockets defined by the straps and bar.

For the purpose of moving the blade of the position shown in Fig. 5, a removable cam device 134 is associated with the end of the cutter bar and includes a cam face 136 having an operating handle extension 138. A button 140 is connected with the cam face 136 by means of a neck 142, the diameter of the button and the size of the neck being sufficiently small as to be received within opening 144. After the blade 116 has been placed within the pocket defined by the portions 130 and 132, the button 140 and neck 142 are inserted into opening 144 from the under side of the bar 54, and the device 134 is turned so that neck 142 is aligned with a slot 146 connecting opening 144 with a smaller opening 148. The latter opening is smaller than the button 140 and substantially the same size as the major dimension of the neck 142, so that when the parts are in this latter position, rotation of the device 134 in a clockwise direction, as viewed in Figs. 4 and 6, will move the blade 116 to its outermost position through cooperation with the edge of the blade and the cam face 136, it being understood that the neck portion 142 rotates within opening 148. To remove the blade, the cam device 134 is turned in a counter-clockwise direction as viewed in Figs. 4 and 6 until the neck portion 142 may be moved through the slot 146 into the opening 144, whereupon the cam device may be readily removed and the blade withdrawn from the pocket. Thus, a novel and relatively simple arrangement is provided for securely maintaining the blades in operative position while permitting their quick and ready removal when desired.

From the foregoing description, it is believed that the operation of the mower will be readily understood. After assembly of the parts, with handle length and wheels adjusted to the proper position, it is only necessary to start the engine 66 whereupon the cutter bar will be rapidly rotated by the transmission of power through the fluid clutch 72 in a well-known manner. In the event that the cutter bar strikes any obstruction which might otherwise damage the parts, the fluid clutch will slip, and the engine torque will be absorbed in circulating the fluid within the clutch. As soon as the obstruction is removed the slip in the clutch is reduced and the cutter bar resumes its rotation.

The present invention thus provides a novel rotary lawn mower structure which requires a minimum of attention by the operator. The use of the fluid clutch and the novel mounting therefor materially increases the flexibility of use and the life of the machine, as well as resulting in a well-balanced, greatly simplified arrangement, capable of economical manufacture in mass production. By providing the tubular framework of light-weight metal, an exceedingly strong and durable structure is obtained, and which is considerably lighter than existing power mowers. The removable blade construction is simple and efficient in operation and enables blades to be quickly turned over to reverse the cutting edges thereof or to be replaced with re-sharpened or new blades. A further important aspect resides in the provision of the annular washer 114 which effectively prevents winding of the grass around the rotatable parts of the mower, which otherwise might cause damage to the parts.

While one embodiment of the invention has been disclosed and described herein, it will be understood by those skilled in the art that various changes may be made therein without departing from the spirit of the invention. Reference will therefore be had to the appended claims for a definition of the limits of the invention.

What is claimed is:

1. A rotary lawn mower comprising a tubular base member of circular form adapted to support a flat base, a rotatable power device supported on said base and having a depending shaft, a cutting member positioned beneath the base, a fluid clutch connecting said shaft and member, a tubular member positioned on each side of said base member and having opposite ends of each secured to said base member at spaced-apart points, the intermediate portions of each tubular member projecting forwardly and downwardly and forming ground-engaging elements, a vertically arranged strut positioned on each side of the mower and being connected at one end to the base member and at the other end to an intermediate point on the tubular member, and a ground engaging wheel supported by each strut.

2. A rotary lawn mower as defined in claim 1 wherein each strut is provided with a plurality of spaced-apart openings for supporting said wheels at different heights.

ROY A. CRAMER, JR.
JOHN D. MAULTSBY.
VANCE O. TERRILL.

REFERENCES CITED

The following references are of record in the file of this patent:

UNITED STATES PATENTS

| Number | Name | Date |
| --- | --- | --- |
| 1,320,590 | Waters | Nov. 4, 1919 |
| 1,336,257 | Muzzy | Apr. 6, 1920 |
| 1,942,562 | Meyers | Jan. 9, 1934 |
| 1,993,639 | Wiswell | Mar. 5, 1935 |
| 2,188,578 | Robinson | Jan. 30, 1940 |
| 2,225,139 | Urschel | Dec. 17, 1940 |
| 2,281,639 | Swan | May 5, 1942 |
| 2,312,972 | Orr | Mar. 2, 1943 |